Aug. 17, 1937. C. B. THORNE 2,090,077
APPARATUS FOR TESTING MATERIALS
Filed Feb. 7, 1936 3 Sheets-Sheet 1

INVENTOR
CARL B. THORNE
BY ATTORNEY

Aug. 17, 1937.  C. B. THORNE  2,090,077
APPARATUS FOR TESTING MATERIALS
Filed Feb. 7, 1936   3 Sheets-Sheet 2

INVENTOR
CARL B. THORNE
BY ATTORNEY

Aug. 17, 1937.     C. B. THORNE     2,090,077
APPARATUS FOR TESTING MATERIALS
Filed Feb. 7, 1936     3 Sheets-Sheet 3

INVENTOR
CARL B. THORNE
BY  ATTORNEY

Patented Aug. 17, 1937

2,090,077

UNITED STATES PATENT OFFICE 2,090,077

APPARATUS FOR TESTING MATERIALS

Carl Busch Thorne, Hawkesbury, Ontario, Canada

Application February 7, 1936, Serial No. 62,797

4 Claims. (Cl. 73—51)

This invention relates to apparatus for testing materials and more particularly to the measuring and recording of the amount of solids carried in suspension in a liquid.

The invention has particular adaptability to the measuring and recording of the quantity of fibre which is being carried away with the waste water of a pulp mill. It is a well known procedure to test the waste or "white" water from a pulp mill in order to ascertain the amount of fibres therein, which normally constitute a considerable loss to the mill, so that proper adjustments may be made to the paper making machines in order to restrict the loss as much as possible. In most instances, samples are periodically taken by hand from the "white" water and tested. Such a procedure is objectionable for obvious reasons: The services of an attendant are necessary; the periods between sampling, being dependent on the attendant, may vary greatly; the necessity of machine adjustment may only become apparent when a sample is tested and, in the meantime, a heavy loss may have occurred during the period between the testing of samples. In some instances, means have been proposed for automatically removing samples of white water at periodic intervals, to be later tested by an attendant.

The present invention has for its object to provide a means for continuously and automatically measuring and recording the amount of solids contained in a liquid and thus, in the application of the invention to the measurement and indication of fibre content in pulp mill waste water, the need of machine adjustments becomes immediately apparent and the consequent potential fibre loss, which is usually of substantial extent, may be avoided.

The invention will now be described with reference to the accompanying drawings, in which Figure 1 is a sectional elevation of a device embodying the invention;

Figure 1:
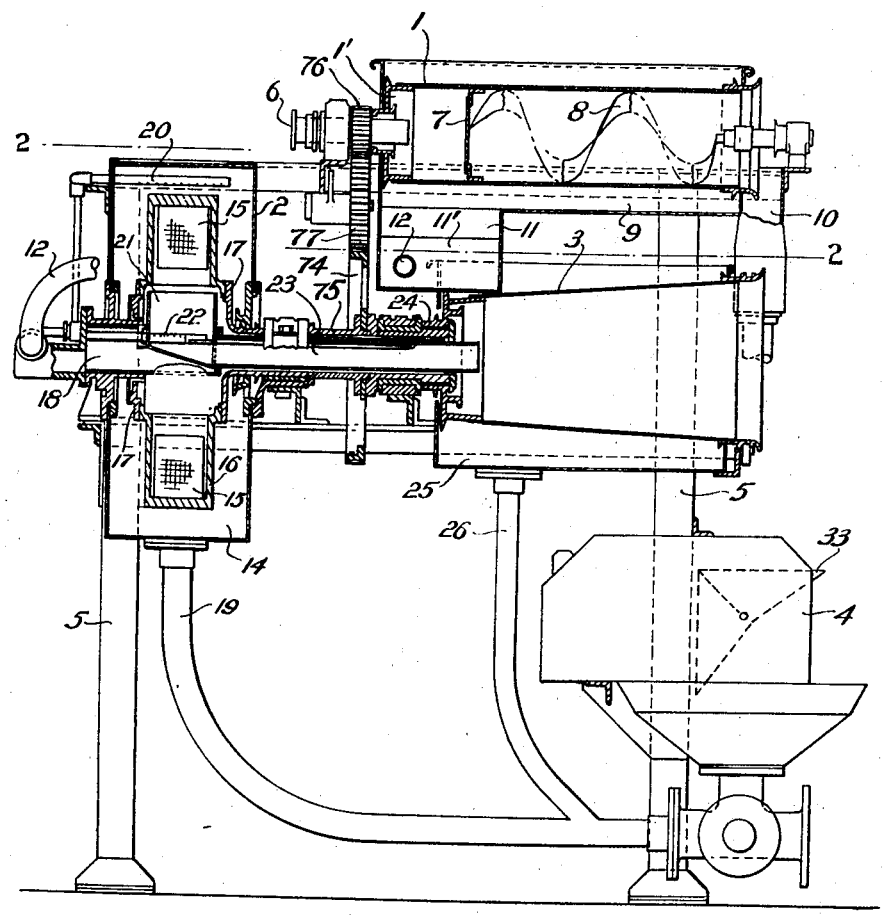
Figure 2:
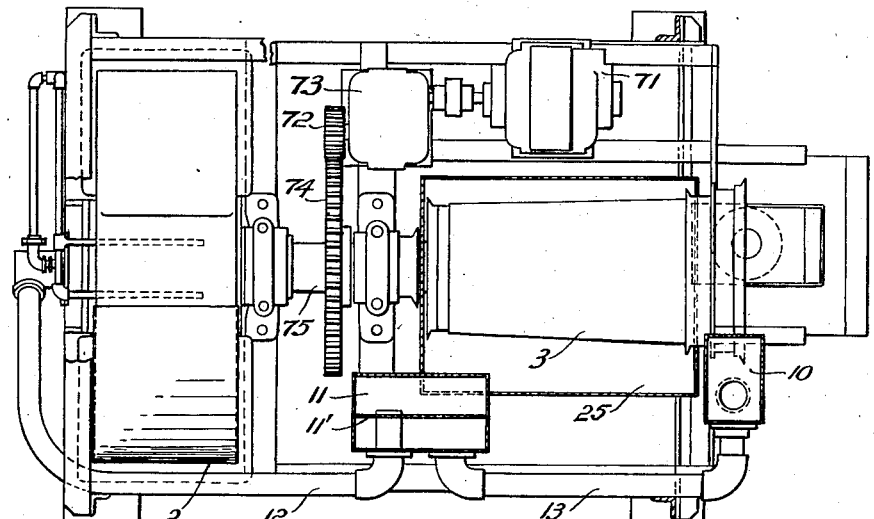
Figure 2 is a sectional plan view on line 2—2 of Figure 1.

The principal parts of the apparatus, as shown in the drawings, are a revolving perforated plate cylinder 1, a fibre separating device 2, a revolving fine screen cylinder 3, which has slightly inclined walls, and a weighing mechanism 4, all of which are mounted on a supporting frame 5.

The plate cylinder 1 is mounted on a hub 1' and is provided with an axial inlet 6 at one end extending through the hub 1' for all or a portion of the waste water from the mill and within the cylinder is placed a baffle plate 7 and a worm 8. This cylinder 1 serves the purpose of removing large coarse particles, such as the knots and slivers in wood pulp, the suspended fine material or fibres passing through the perforated plate into a trough 9 surrounding the cylinder 1, while the coarse particles are carried to the end of the cylinder by the worm 8 and discharged into a container 10 which leads to the sewer. The liquid containing the suspended fibres flows into a box 11 at one end of trough 9 and thence through a pipe 12 to the centre of the fibre separator 2. A weir 11' may be provided in box 11, whereby any excess water may flow over the same and be led off to the sewer through a pipe 13 connected to pipe 10.

The fibre separator 2 is of the type described in detail in prior United States Patent No. 1,826,485 and is not claimed specifically herein. This separator may be of a very small size proportionate to the volume of water under treatment and consists of a cylindrical casing 14 withtn which are mounted a plurality of revolving screens 15 carried by a framework 16 mounted on hubs 17. An inlet 18 which is provided for the white water at the centre of the casing 14 communicates with pipe 12 and extends through a hub 17 to discharge into the several lowermost screens 15. The water flows through the screens into casing 14 and is discharged through pipe 19 to the sewer, while the fibre particles cling to the screen and are carried to the top where they are washed off by a spray pipe 20 into a small stationary hopper 21, which discharges the particles with the aid of a second spray pipe 22 into a pipe 23.

Pipe 23 discharges into the fine screen cylinder 3 which, it will be noted, is mounted coaxially with the separator 2 on a hub 24. The cylinder 3 serves as a thickener for the fibres, the water passing through the screen into a trough 25 thence through a pipe 26 to the sewer, and the fibres rolling down the incline of the cylinder and discharging from the end thereof.

Driving power is supplied by means of a motor 71, which drives a gear 72 through a suitable speed reducer 73. Gear 72 meshes with a gear 74 mounted on a hollow shaft 75 to which are secured the hubs 17 of the separator 2 and hub 24 of cylinder 3. Cylinder 1 is rotated by means of a gear 76 mounted on the hub 1' and which meshes with a gear 77 which in turn meshes with gear 74. If necessary, the speed of rotation of the thickening cylinder 3 may be increased by suitable gearing.

The weighing mechanism 4 includes a supporting structure therefor comprising a pair of side plates 27 secured in place by rods 28 passing through sleeves 29, a pair of weight arms 30 carried by a beam 31 suspended at either end from lugs 32 secured to the side plates 27, a hopper 33 suspended from one end of the weight arms 30 and a weight box 34 suspended from the other end of the weight arms 30. A suitable point of suspension for the beam 31 is provided by the cooperating projections 35 and 35' at either end of the beam and on the lugs 32, respectively. Similarly, hopper 33 and weight box 34 are provided with points of suspension by projections 36 formed on suspension plates 37 of the hopper and on suspension arms 38 of the weight box and cooperating projections 36' formed at either end of the weight arms 30. Downward movement of the weight box 34 is limited by means of stops 34' on the suspension arms 38 and corresponding stops 38' on the plates 27.

Figure 3:
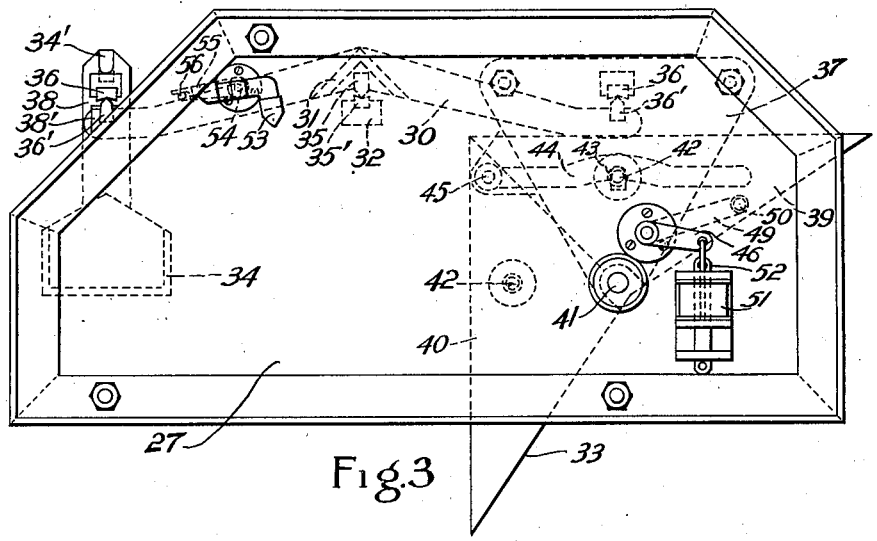
Figure 3 is an enlarged side elevation of the weighing mechanism.
Figure 4:
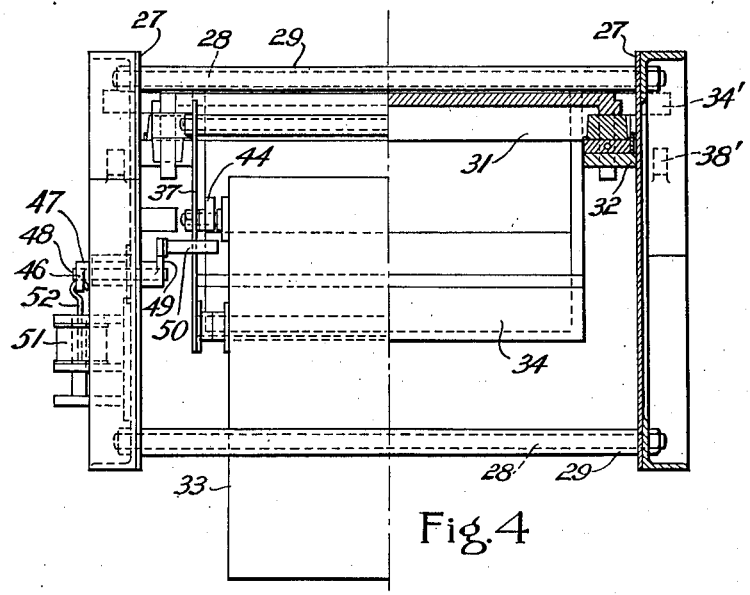
Figure 4 is an enlarged end elevation, partly in section, of the weighing mechanism.

The hopper 33 is provided with two compartments 39 and 40 adapted to receive the material to be weighed, the receiving openings of the compartments being in planes at right angles to each other. The hopper 33 is pivoted at 41 to the suspension plates 37 whereby it may rotate in order to successively dump one or other of the compartments and place the opening of the other compartment in receiving position. It will be noted that the centre of gravity of the hopper when compartment 39 is in receiving position, as shown in Figure 3, is to the right of the centre of suspension so that as material is received by compartment 39 the centre of gravity moves more to the right and when a predetermined quantity of material is received by the compartment 39, the hopper tends to rotate in a clockwise direction to dump compartment 39 and place compartment 40 in receiving position. The centre of gravity of the hopper is then to the left of the centre of suspension and the reverse action takes place to dump compartment 40 and place compartment 39 in receiving position.

The two receiving positions of the hopper are accurately determined, and the hopper retained therein, by means of pins 42 projecting from the side wall of each compartment 39 and 40 and adapted to engage a corresponding groove 43 in a lever 44 pivoted at 45 on one suspension plate 37. Means are provided for moving the lever 44 out of engagement with the pins 42 in order to permit dumping of the compartments and comprises a solenoid-actuated link 46 carried by one end of a sleeve 47 mounted on a shaft 48 secured in one of side plates 27 adjacent the hopper 33, the other end of sleeve 47 carrying a second link 49, on which is mounted a pin 50 adapted to engage the lever 44. A solenoid 51 is provided with an operating plunger 52, the outer end of which is connected to link 46, whereby when the solenoid is energized to move the plunger 52 in an upward direction, the link 46, through the sleeve 47 and link 49, causes the pin 50 to strike lever 44 and move it out of engagement with pin 42.

A mercury switch 53 is mounted on one end of a shaft 54 carried by a side plate 27 adjacent one of the weight arms 30. A lever 55 is mounted on the other end of shaft 54 and is connected to a pin 56 carried by the weight arm 30. Thus tilting of the weight arm 30 operates to close or open the circuit of the switch.

Figure 5:
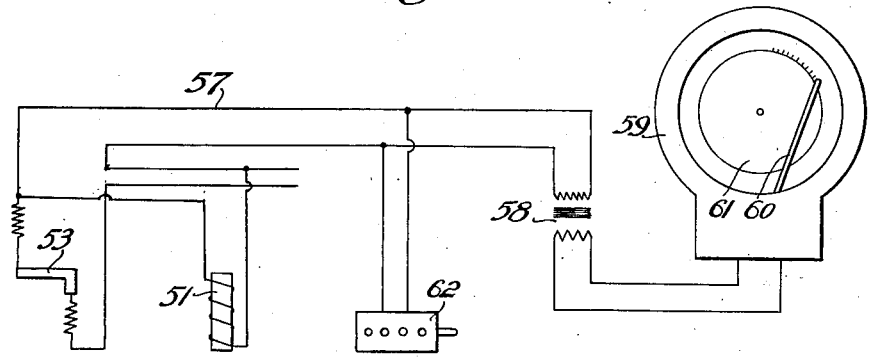
Figure 5 is a diagram of a suitable electrical circuit for use in conjunction with the weighing mechanism.

A suitable electrical circuit for use in connection with the weighing device is diagrammatically illustrated in Figure 5 and comprises a main energized circuit 57 connected to the terminals of the mercury switch 53 and through a transformer 58 to a suitable recording mechanism 59 having a recording arm 60 and chart 61. The solenoid 51 is also in the circuit 57, as shown, as is also any suitable electric counter 62.

The operation of the weighing mechanism in conjunction with the fibre separating mechanism will be apparent. The weighing mechanism is mounted on the supporting frame 5, as shown in Figure 1, in such a position that the discharged material from cylinder 3 drops into one or other of compartments 39 or 40 of hopper 33. When empty, the weight box 34 balances the hopper 33 and weights equal to the weight it is desired to weigh per hopper discharge are placed in the weight box, which drops to engage its stops 34' and 38' and tilts the arms 30 whereby the mercury switch 53 breaks the electrical circuit. When the correct weight of material has fallen into the hopper, the arms 30 tilt in a clockwise direction to the position shown in Figure 3 and cause the mercury switch 53 to close the circuit. Closing of the circuit energizes the solenoid 51 to operate its plunger 52 to disengage the lever 44 and allow the hopper to dump. Closing of the circuit also actuates the arm 60 of the recorder 59 whereby the chart 61 is marked to represent a certain predetermined number of pounds of fibre, from which the total fibre loss may be calculated. The electric counter 62 may be provided in order to record the number of dumps made by the hopper in a given period.

The amount of fibre loss in white water may therefore be accurately and continuously ascertained by means of the apparatus described and necessary adjustments or repairs made at once in order to reduce the loss.

I claim:

1. Apparatus for testing the amount of fibres contained in the waste water of pulp mills comprising a rotary perforated cylinder adapted to remove coarse particles from said waste water, a separating device adapted to receive the waste water from said perforated cylinder and to remove the fibres therefrom, a rotary screen cylinder adapted to thicken said fibres, weighing means adapted continuously to receive fibres from said screen cylinder and successively to weigh predetermined quantities of said fibres and means for continuously recording the weights of said quantities.

2. Apparatus for testing the amount of solids in a flowing fluid suspension comprising means for continuously removing from said flow a constant portion of said suspension, means for removing the solids from said removed portion as it flows to be discharged, weighing means arranged continuously to receive said solids as they are separated and successively to weigh predetermined quantities thereof and means for recording said successive weights.

3. Apparatus for testing the amount of fibres in the flowing waste water of paper mills comprising means for continuously removing from said flow a constant portion of said waste water, a separating device adapted to receive said portion and to remove water therefrom, means to receive the concentrated fibres and to thicken them to a predetermined density and weighing means adapted continuously to receive said thickened fibres and successively weigh predetermined quantities thereof while said waste water continues to flow.

4. Apparatus for testing the amount of fibres in the flowing waste water of paper mills comprising means for removing coarse particles from the flowing waste water, means for continuously removing from said flow a constant portion of the partially purified waste water, a separating device to receive said portion and to remove fibres therefrom, a rotary screen cylinder to thicken the fibres to a predetermined density, and weighing means adapted to receive said thickened fibres and to successively weigh predetermined quantities thereof while said white water continues to flow.

CARL BUSCH THORNE.